(12) United States Patent
McIntosh (10) Patent No.: US 9,134,427 B2
(45) Date of Patent: Sep. 15, 2015

(54) DETERMINATION OF TIME ZONE AND DST PARTICIPATION

(75) Inventor: Andrew Tyler McIntosh, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1120 days.

(21) Appl. No.: 12/684,042

(22) Filed: Jan. 7, 2010

(65) Prior Publication Data

US 2011/0163873 A1     Jul. 7, 2011

(51) Int. Cl.
| | |
|---|---|
| G08B 1/08 | (2006.01) |
| H04W 24/00 | (2009.01) |
| G01S 19/14 | (2010.01) |
| H04W 8/12 | (2009.01) |
| H04W 64/00 | (2009.01) |
| G08G 1/0969 | (2006.01) |
| G06Q 10/08 | (2012.01) |
| G04G 5/00 | (2013.01) |
| G04R 20/06 | (2013.01) |

(52) U.S. Cl.
CPC . *G01S 19/14* (2013.01); *G04G 5/00* (2013.01); *G04R 20/06* (2013.01); *G06Q 10/08* (2013.01); *G08G 1/0969* (2013.01); *H04W 8/12* (2013.01); *H04W 64/00* (2013.01)

(58) Field of Classification Search
CPC .......... G08G 1/0969; G08G 1/096716; G06Q 10/08; G01S 19/14; G04G 5/00; G04R 20/06; H04W 64/00; H04W 8/12; H04W 4/22; G01C 21/32; G01C 21/367
USPC .............. 340/539.13, 995.1, 905, 573.1, 527; 368/14, 21; 455/503, 456.1, 433, 455/435.1, 404.2, 456.6; 701/409, 446, 701/455, 454
See application file for complete search history.

(56) References Cited

U.S. PATENT DOCUMENTS

| | | | | |
|---|---|---|---|---|
| 5,724,316 | A | * | 3/1998 | Brunts ............................ 368/10 |
| 5,920,824 | A | * | 7/1999 | Beatty et al. ................... 455/425 |
| 6,278,660 | B1 | * | 8/2001 | Tognazzini ..................... 368/21 |
| 6,366,834 | B1 | * | 4/2002 | Hayes et al. ..................... 701/1 |
| 6,950,662 | B2 | * | 9/2005 | Kumar ........................ 455/456.3 |
| 7,852,711 | B1 | * | 12/2010 | Fitzgerald et al. .............. 368/21 |

(Continued)

FOREIGN PATENT DOCUMENTS

| | | |
|---|---|---|
| CN | 101103619 A | 1/2008 |
| CN | 101112077 A | 1/2008 |

(Continued)

OTHER PUBLICATIONS

International Search Report and Written Opinion—PCT/US2011/020585—ISA/EPO—Nov. 25, 2011.

(Continued)

*Primary Examiner* — Hoi Lau
(74) *Attorney, Agent, or Firm* — Howard Seo (57) ABSTRACT

A local time zone setting for a device is automatically provided based on a location and a date and time. Location information is obtained for a present location of the device within a geographical area and the date and time. An association is established between the present location and a geopolitical portion of the geographical area, the geopolitical portion including time zone application rules. The local time zone setting is automatically provided based on the time zone application rules, which can include daylight savings time (DST) participation, and the present date and time.

29 Claims, 6 Drawing Sheets

(56) References Cited

U.S. PATENT DOCUMENTS

| | | | |
|---|---|---|---|
| 7,948,832 B1* | 5/2011 | Luo et al. .................. | 368/21 |
| 2002/0119788 A1 | 8/2002 | Parupudi et al. | |
| 2004/0203848 A1* | 10/2004 | Kumar .................. | 455/456.1 |
| 2005/0070282 A1* | 3/2005 | Hinz .................. | 455/435.1 |
| 2006/0099969 A1 | 5/2006 | Staton et al. | |
| 2006/0252438 A1* | 11/2006 | Ansamaa et al. .......... | 455/503 |
| 2007/0276593 A1 | 11/2007 | Mutoh | |
| 2009/0135675 A1* | 5/2009 | Akiyama .................. | 368/14 |
| 2009/0168609 A1 | 7/2009 | Weir et al. | |
| 2009/0190444 A1* | 7/2009 | Akiyama et al. ............ | 368/14 |
| 2010/0124735 A1* | 5/2010 | Chen et al. ................ | 434/284 |
| 2011/0055244 A1* | 3/2011 | Donelli .................. | 707/769 |
| 2011/0151415 A1* | 6/2011 | Darling .................. | 434/149 |

FOREIGN PATENT DOCUMENTS

| | | |
|---|---|---|
| EP | 19920100830 | 8/1992 |
| JP | H05164857 A | 6/1993 |
| JP | 2003131881 A | 5/2003 |
| JP | 2006029960 A | 2/2006 |
| JP | 2007315953 A | 12/2007 |
| JP | 2009180528 A | 8/2009 |
| JP | 2009245397 A | 10/2009 |
| JP | 2009259124 A | 11/2009 |
| TW | 200702958 | 1/2007 |
| TW | 200928411 A | 7/2009 |

OTHER PUBLICATIONS

Taiwan Search Report—TW100100711—TIPO—Dec. 6, 2013.

* cited by examiner

DETERMINATION OF TIME ZONE AND DST PARTICIPATION

FIELD

The present application is related to time zone determination, and more specifically, to establishing a time zone based on a current location and geopolitical rules for the location.

BACKGROUND

The widespread use of atomic clocks, computer networks, satellite positioning receivers and devices that incorporate satellite receivers has made synchronizing time a nearly fully automated process. However, one aspect of time setting that still requires manual intervention is setting the correct time zone based on participation in daylight savings time (DST) or other deviation from the actual time zone associated with a region.

In accordance with the standard or universal time zone map as shown, for example, in FIG. 3, to be described in greater detail hereinafter, the globe can be divided into zones of about 15 degrees that correspond to one hour intervals from a reference zone known as Greenwich Mean Time (GMT). While the mathematical determination of a time zone for a given location is relatively simple, geopolitics influences whether or not a country or a region adopts the mathematical time zone as its accepted time zone. China, for example, spans many actual time zones but uses a single time zone throughout the country based on political convention. While the mathematical time zone boundaries generally follow every 15 degrees of longitude, in practice, the lines are moved to follow geopolitical boundaries. Since the boundaries, as well as their corresponding DST rules are subject to change, and since changes are not coordinated and adopted in a uniform fashion by a global authority, providing accurate automated time zone setting becomes a difficult task. Further complicating accurate time zone setting is that some regions of the world participate in Daylight Savings Time (DST) while others do not. Still further, different countries observe DST during different times of the year and according to different start times and end times.

A conventional approach is to provide a capability to manually set the time zone and presumes that time zone settings will not change often. The Windows® Operating System, for example, allows the user to select the time zone by clicking on a region of a map and checking if DST is observed or not. In other systems, such as alarm clocks, a mechanical switch can be provided to select the time zone. In still other systems, such as SPS navigation systems, the current time zone is also manually set. Such approaches can be inconvenient where, for example, a user interface is not provided, or where equipment having a common software load or initial configuration is shipped to many different parts of the world, or may be used across many time zones. It would be desirable therefore in the art for a capability to provide an accurate time zone.

SUMMARY

Exemplary embodiments are directed methods and devices for automatically providing a local time zone setting for a device based on location information such as that obtained from a satellite positioning system (SPS), or other source of location information, and a date and time such as a universal date and time. An accurate, automated time zone setting for a device is advantageous for devices that travel often between time zones or in a case where the device must interface with other devices or networks where accurate time setting is an important operational parameter.

Accordingly, an embodiment can include a method for automatically providing a local time zone setting for a device. The method can include obtaining location information for a present location of the device within a geographical area and a present date and time; establishing an association between the present location and a geopolitical portion of the geographical area, the geopolitical portion including time zone application rules; and automatically providing the local time zone setting based on the time zone application rules and the present date and time.

Another embodiment can include an apparatus for automatically providing a local time zone setting for a device. The apparatus can include a receiver in the device, the receiver obtaining location information for a present location of the device within a geographical area and a present date and time; a processor coupled to the receiver, the processor configured to: establish an association between the present location and a geopolitical portion of the geographical area, the geopolitical portion including time zone application rules; and automatically provide the local time zone setting based on the time zone application rules and the present date and time.

Another embodiment can include an apparatus for automatically providing a local time zone setting for a device. The apparatus can include means for obtaining location information for a present location of the device within a geographical area and a present date and time; means for establishing an association between the present location and a geopolitical portion of the geographical area, the geopolitical portion including time zone application rules; and means for automatically providing the local time zone setting based on the time zone application rules and the present date and time.

Another embodiment can include a machine- or computer-readable medium comprising instructions for automatically providing a local time zone setting for a device the instructions, when executed by a computer, cause the computer to perform operations, the instructions can include instructions to obtain location information for a present location of the device within a geographical area and a present date and time instructions to establish an association between the present location and a geopolitical portion of the geographical area, the geopolitical portion including time zone application rules; instructions to automatically provide the local time zone setting based on the time zone application rules and the present date and time.

BRIEF DESCRIPTION OF THE DRAWINGS

The accompanying drawings are presented to aid in the description and are provided solely for illustration of embodiments and not limitation thereof.

DETAILED DESCRIPTION

Aspects are disclosed in the following description and related drawings directed to specific embodiments. Alternate embodiments may be devised without departing from the scope of the invention. Additionally, well-known elements will not be described in detail or will be omitted so as not to obscure the relevant details.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that, upon execution, would cause an associated processor to perform the functionality described herein. Thus, the various aspects may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

As used herein, a mobile station (MS) refers to a device such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The term "mobile station" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile station" is intended to include all devices, including wireless communication devices, computers, laptops, etc. which are capable of communication with a server, such as via the Internet, WiFi, or other network, and regardless of whether satellite signal reception, assistance data reception, and/or position-related processing occurs at the device, at a server, or at another device associated with the network. Any operable combination of the above are also considered a "mobile station."

As also used herein, a satellite positioning system (SPS) typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs). For example, a SV in a constellation of Global Navigation Satellite System (GNSS) such as Global Positioning System (GPS), Galileo, Glonass or Compass may transmit a signal marked with a PN code that is distinguishable from PN codes transmitted by other SVs in the constellation (e.g., using different PN codes for each satellite as in GPS or using the same code on different frequencies as in Glonass). In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

Figure 1:
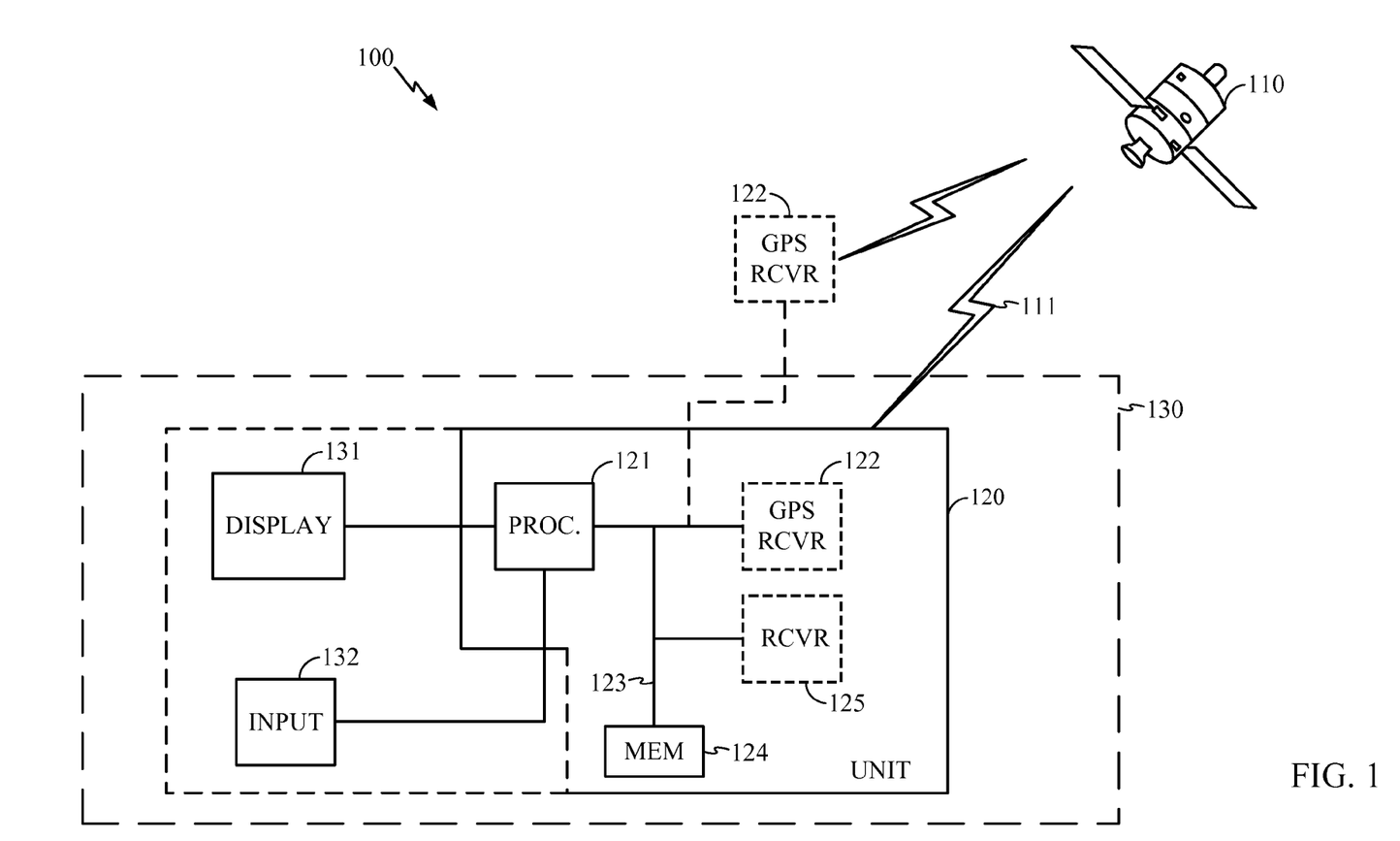
FIG. 1 is a block diagram illustrating an exemplary device having a receiver receiving location information.

A typical system that determines positioning information based on signals from a satellite positioning system (SPS) is shown in FIG. 1. Therein, a scenario 100 illustrates a device or a unit such as a mobile station 130, which can be a mobile station that receives SPS information from an SPS satellite 110 over a link 111. The SPS information can include typical SPS timing information that allows a determination of longitude and latitude or other x, y coordinates and further can include a universal date and time such as Greenwhich Mean Time (GMT) or the like or can be a local date and time. The information can be received at an SPS receiver 122, which can be located externally to the mobile station 130 or within the mobile station 130. Alternatively, location information and date and time information can be received from other sources at a receiver 125, which can be an FM receiver, a wireless network receiver, or satellite receiver other than an SPS satellite receiver that is capable of transferring location and time information. In some embodiments, the receiver can provide a connection to the Internet where various sites are available to provide information, which can then be used to update information, such as tabularized information, as will be described in greater detail herein below.

It will further be appreciated that the SPS receiver 122, if located within the mobile station 130, can be located in a positioning apparatus 120 or as a separate unit. If SPS receiver 122 is a separate unit that is configured to provide a local date and time, an exemplary device can be configured to recognize what time is being provided and automatically set the local time accordingly. Whether internal or external, the SPS receiver 122 can be coupled to a processor 121 through a connection 123, which can be a bus, a data line, or the like. The processor 121 can also be coupled to a memory 124 through the connection 123 or through a separate connection (not shown). The mobile station 130 is further provided with a display device 131 and an input device 132 that can be coupled to the positioning apparatus 120 or can be incorporated into the positioning apparatus 120. The display device 131 can be a display that includes, but is not limited to an LCD, LED, plasma display or the like. The input device 132 can be a mouse, keyboard, touch screen, joystick, or other input device working independently or in connection with the display 131, such as in the event the input device 132 is a touch screen device, joystick, joystick-like device, haptic device, or the like, that allows for scrolling through a series of selections that are displayed including a virtual keyboard or the like. It will be appreciated that the combination of elements described herein can act independently or together in accordance with various embodiments to form means as claimed herein.

Figure 2:
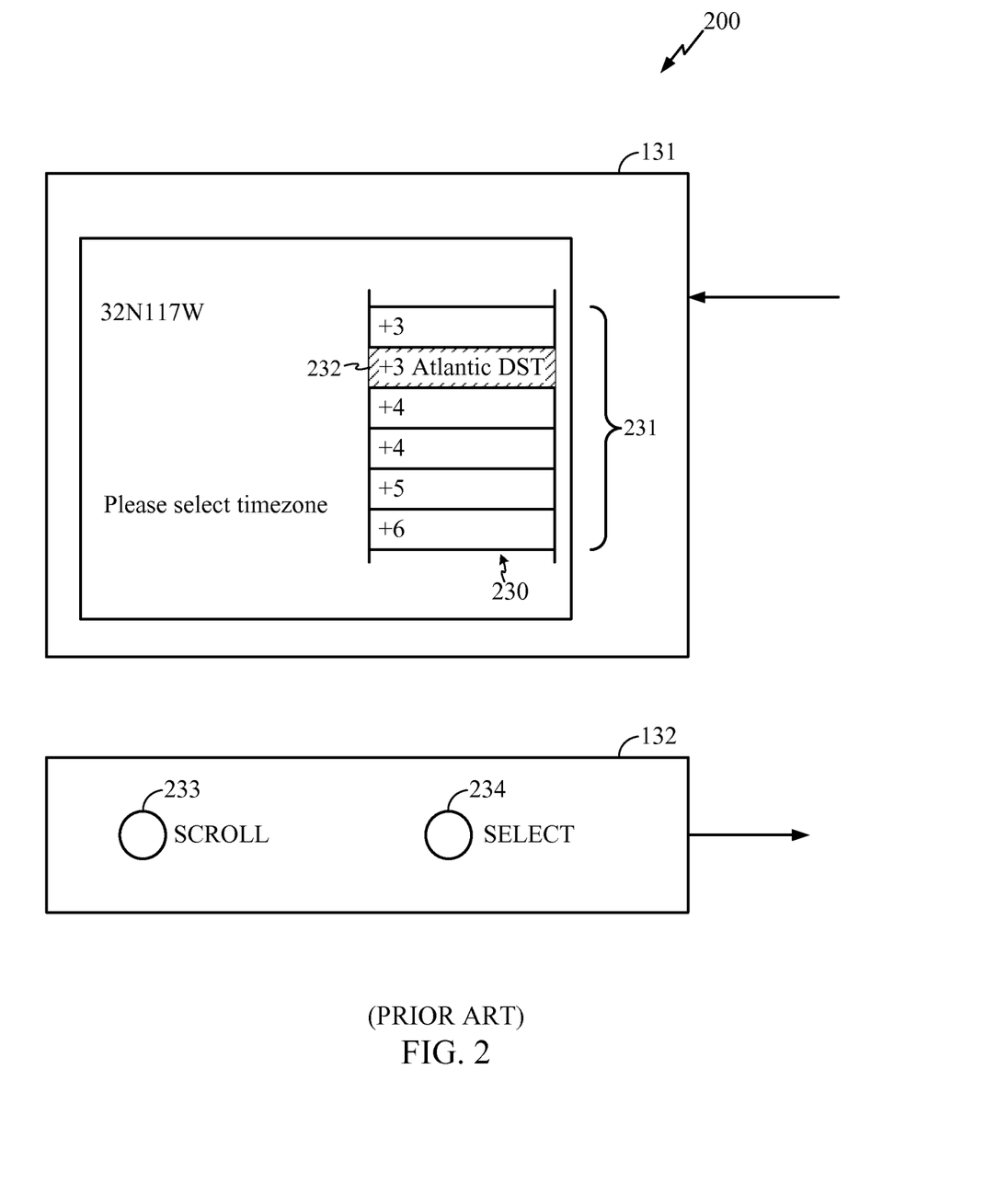
FIG. 2 is a block diagram illustrating conventional time zone setting using a display and input device.

As mobile station 130 travels throughout a geographical area, or as the positioning apparatus 120 moves from its point of production to the point of ultimate use, or, for example upon first use or later upon set-up, the need will arise to set the time including setting the correct time zone and daylight savings time (DST) participation. A conventional manner of setting the time zone is shown in scenario 200 of FIG. 2. The display 131 can project or otherwise render an image 230, which can include a list 231 of the possible time zones. In the example, one of the listed time zones is highlighted as a selection candidate 232. The displayed image 230 can include additional information such as an SPS coordinate and instructions for a user of the system. A simplified version of the input device 132 is shown having, for example, a scroll button 233 and a select button 234. It will be appreciated that scroll button 233 and select button 234 are shown for illustrative purposes, and could alternatively be implemented in mouse buttons or in software buttons shown in the image 230 that are selectable by a moving a mouse pointer over the buttons and clicking the mouse, or by moving the mouse pointer and double-clicking directly on the highlighted item, or the like or in any other manner that will result in the selection of the highlighted time zone selection candidate 232. As will be appreciated, manipulation of such a selection can be time consuming and, further, it is not always easy to determine which of the offered selections represent the correct setting. Such tedious manipulation and potential confusion could be eliminated and the process simplified if the time zone were automatically provided as described herein according to various exemplary embodiments.

Figure 3:
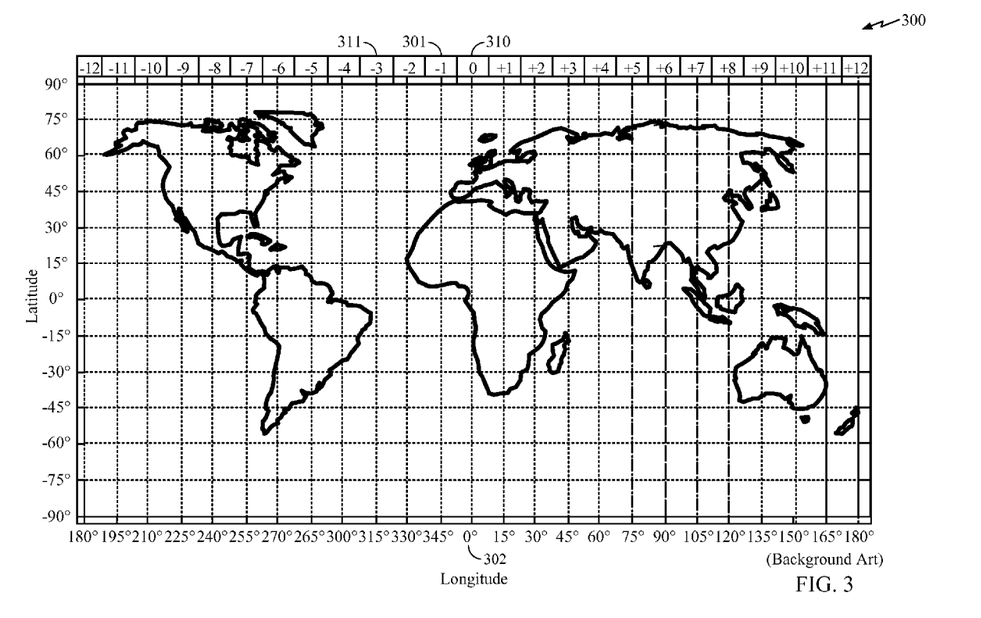
FIG. 3 is a global map illustrating standard time zone divisions.

To better appreciate the difficulties associated with determining time zones and time zone related factors, an understanding of the background of basic time zones as shown in FIG. 3 will be helpful. A geographic representation such as a global map 300 rendered with a well-known Mercator projection. Such a projection linearizes the spherical surface of the map into a rectangular projection while distorting the apparent size and shape of land masses that are closer to the poles where the scale increases. For time zone purposes, the Mercator projection is useful since it normalizes the width of longitudinal sections at the extreme north and south ends, which would normally be of decreasing width. From a mathematical standpoint, global map 300 can be divided into 24 zone segments 311 corresponding to the hours in a day, that is, the time required for one complete revolution of the earth. Segments 311 can be referenced as a function of their respective distance from a reference point 310, which in modern practice is generally referred to, for example, as Greenwich Mean Time (GMT), Zulu time (military), or Coordinate Universal Time (UTC). It will be appreciated that for mathematical purposes any zone can act as a reference. Segments 311 therefore can be represented by their offset in terms of one-hour zones from the reference point 310. It will also be appreciated that for each hour offset 301, a 15 degree physical offset 301 can be associated with corresponding one of the 24 segments of the 360 degree circumference of the earth associated with one complete revolution.

Figure 4:
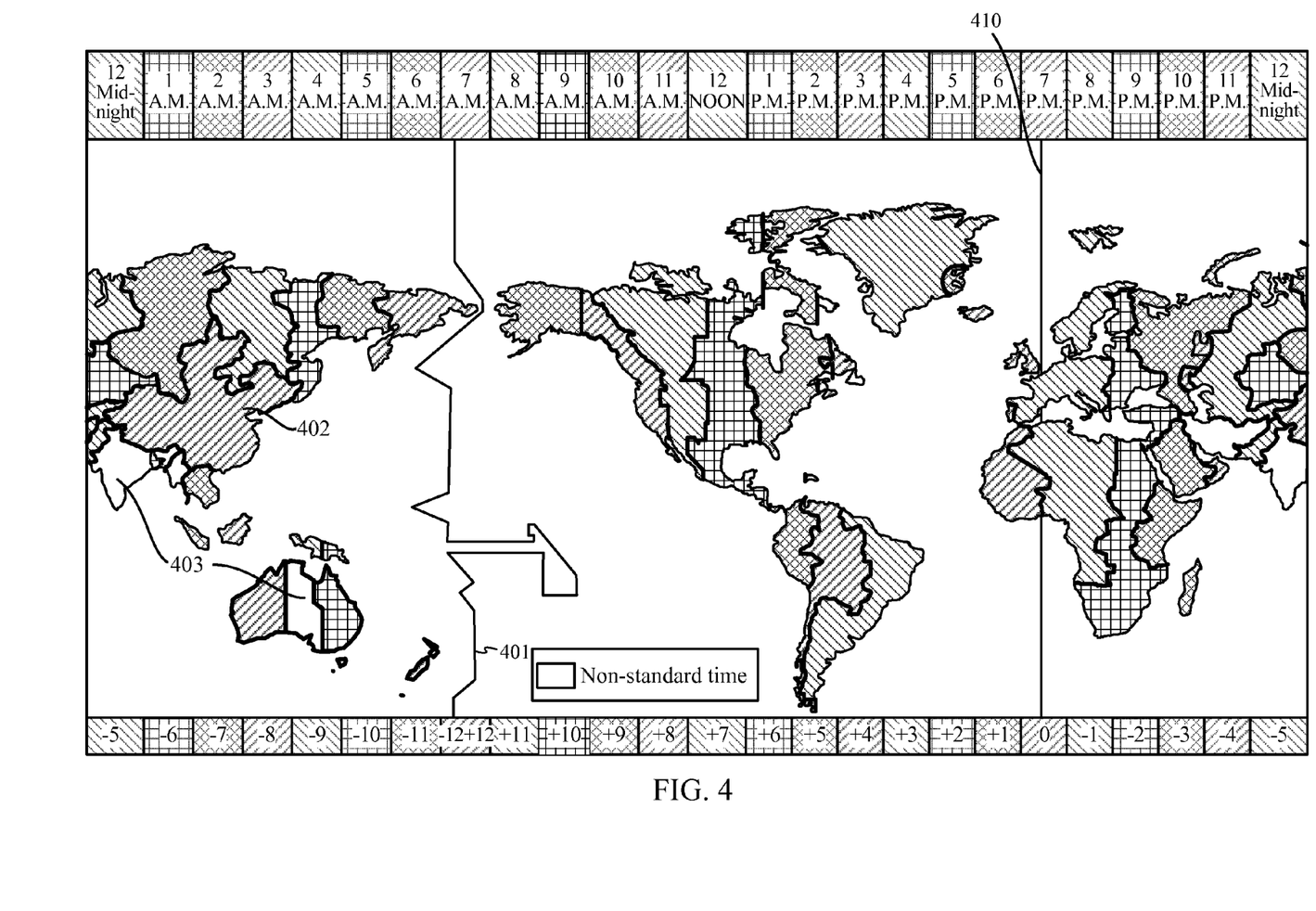
FIG. 4 is a global map illustrating exemplary geopolitical portions having deviations from the standard time zone divisions.

While it is appreciated that the earth can be divided into zones with mathematical precision, geopolitical considerations are responsible for a large number of deviations in the actual time zone used in any given geographical region and related anomalies, as is illustrated in FIG. 4. While reference point 410 refers to GMT as in the above example, and reference point 401 refers to the International Date Line, various other zones deviate from the precise mathematical zone. For example, on a global scale, zone 402 encompasses the entire country of China, while non-standard regions 403 include the central region of Australia and India. More local examples can include time zone anomalies associated with recognition of DST within the same zone. Within various parts of the U.S. DST participation changes from county to county and even within relatively small regions. For example, within certain regions of Arizona, there are Indian reservations located within counties and regions within the reservations, all of which have different participation in DST, leading to the possibility of many time zone inconsistencies even within small areas. It should be clear that because of the geopolitical considerations in establishing the time zone for a particular region, including the DST participation, and the division of these regions into irregular geopolitical boundaries, the correct time zone is not easily susceptible to being set based on geography alone, such as by the above described mathematically divided zones. Further, because geopolitical power and time zone adoption-related conventions changes with time, sometimes frequently, the time zone rules are also susceptible to frequent change. When global coverage is contemplated, the challenges are increased by orders of magnitude.

Figure 5:
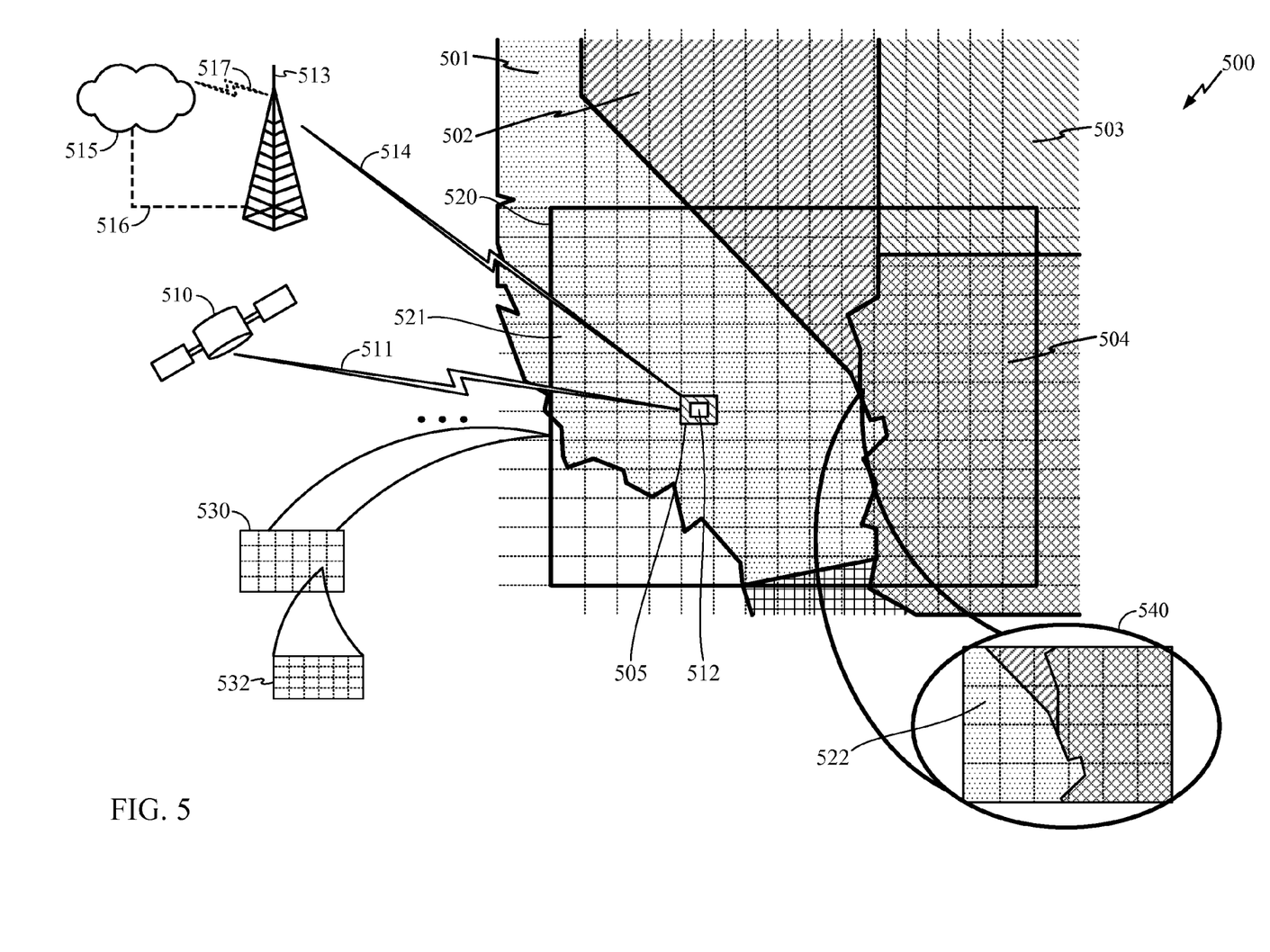
FIG. 5 is a grid map illustrating an exemplary correspondence between a location, a grid cell and a geopolitical portion having a time zone rule.

To address the challenge, a time zone can be automatically provided in an exemplary geographical area 500, or representation thereof, as shown in FIG. 5 that is serviced by a satellite positioning system (SPS) satellite 510 that provides information from which a location can be determined and a date/time such as a universal date and time to an SPS receiver that is located in a unit, such as a mobile unit 512 over a link 511. Alternatively, location information and date and time can be provided to a non-SPS receiver, such as receiver 125 shown in FIG. 1, that receives a signal other than an SPS signal. It will be appreciated that location can be obtained from non-SPS sources such as a cellular tower 513 that broadcasts latitude (LAT) and longitude (LON) over a link 514, such as on the paging channel or the LAT/LON provided in connection with Internet based location services that can be provided from cloud 515 over a wireless link 517 or a wired link 516. In such an example cellular tower 513 can alternatively be a WiFi access point or the like or can provide Internet connectivity as will be appreciated.

The non-SPS receiver can be, for example a radio frequency (RF) receiver, including a standard frequency modulated (FM) receiver, cellular receiver, satellite radio receiver, or can include a wireless network receiver that receives information from the Internet and the like. It will be appreciated that, for example, date/time information is available from various websites such as the official U.S. time as derived from the atomic clock standard at http://www.time.gov/, or military/oceanographic sites such as the Naval Oceanography Portal at http://www.usno.navy.mil/, or the like. The information received from the alternative source can be converted into an internal format such as a format that includes longitude, latitude, date and time or the like, and is compatible with tabularized information as shown and described below.

The geographical area 500 can be divided into geographical regions or geopolitical portions 501-504 that, for illustrative purposes can have different time zone application rules including, for example, daylight savings time (DST) participation rules. In the present example, a unit, such as a mobile unit 512, can be located in a present cell 505 of a particular one of the geopolitical portions 501-504 such as geopolitical portion 501. A grid 520 divided into cells 521 can be overlaid on the geographical area 500, or representation thereof. Each of the cells 521 can be provided with time zone application information 530 in the form of, for example, a table entry, or the like. The time zone application information 530 can include information as follows.

TABLE 1

Time zone application information

| Color | StdTxt | StdTime | DSTTxt | DSTTime | Start | End | Comment |
|---|---|---|---|---|---|---|---|
| 7 | PST | −8:00 | PDT | −7:00 | 1st Sun April | 1st Sun Oct | Pacific US |
| 8 | MST | −7:00 | — | — | — | — | Arizona |
| 9 | MST | −7:00 | MDT | −6:00 | 1st Sun April | 1st Sun Oct | Mountain US |

In Table 1, "Color" can refer to the various geopolitical portions 501-504 each of which share common time zone application rules. In addition, color can refer to a specific color applied when a representation of geographical area 500 is rendered, for example, on a display. For each geopolitical portions 501-504 associated with a particular color, time information can be stored. For example, for color 7 in the present example, various information such as the text representing the name associated with the time zone such as Pacific Standard Time (PST), the time offset relative to a reference zone associated with the color, the text representing the name associated with the daylight savings time participation such as Pacific Daylight Time (PDT), the time offset after application of a correction factor associated with DST if any, the start and end times of the DST participation and other information, can be stored as part of the time zone application information 530. It will be appreciated that, based on the date/time received from the SPS satellite 510, or other source (not shown), the correction application of DST can be applied based on the information in the table. In the event that the universal date and time are provided, the device can calculate the offset from the universal time and adjust accordingly or the table can be arranged in terms of universal date and time.

As the mobile unit 512 moves within the geographical area, it enters and leaves various cells 521 of the grid 520. In some instances, the present cell 505 can include various ones of the geopolitical portions 501-504 such as in the magnified view 540. Accordingly, an additional level of resolution can be applied to identify subcells 522 within the cells 521 and apply time zone rules as necessary. The information for the subcells 522 can be included in a subtable 532. It will be understood that the resolution can be increased indefinitely, limited only by the capacity of, for example, memory devices and the like.

Figure 6:
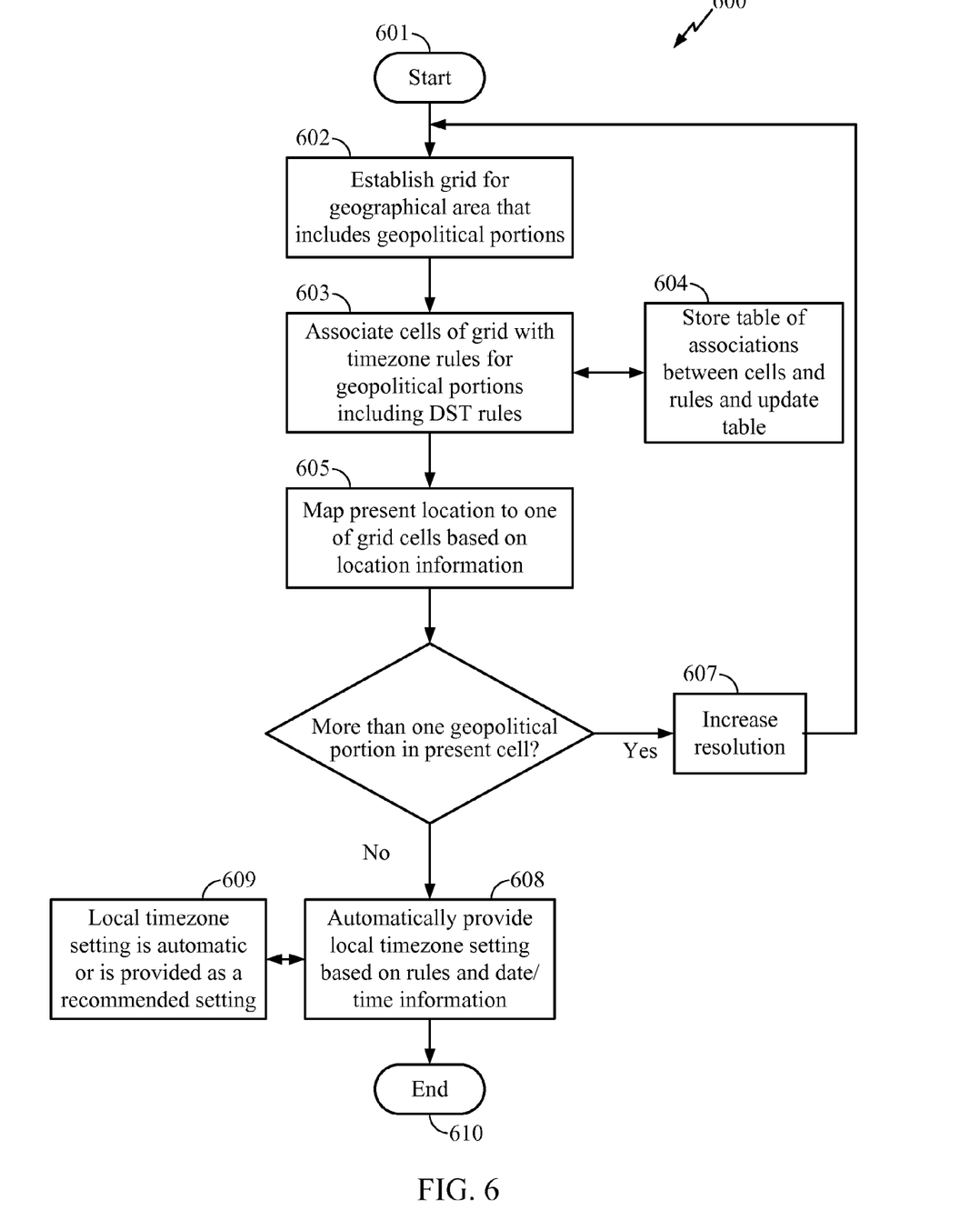
FIG. 6 is a flow chart illustrating an exemplary method for providing a time zone setting.

In accordance with an embodiment, an exemplary process 600 can be used with various hardware and software configurations, for example as described herein, to carry out the invention as shown and described in connection with FIG. 6. After start at 601, a grid can be established to overlay a geographical area including geopolitical portions at 602. It should be noted that the term "geographical area" can refer to an expanse defined by, for example, SPS coordinates of boundary points or of points within an unbounded area and can be purely virtual in nature and representative of a portion of the surface of the Earth. The geographical area can also be a representation such as a map or the like that is displayed on a display portion of a system. The term "geopolitical portion" can refer generally to portions of the geographical area that are divided according to political or geopolitical boundaries such as state lines, county lines, country borders and the like that delineate areas that may have different rules regarding the application of time zones including DST participation.

Regardless of the exact form of the geographical area, the grid can be a mechanism that represents mathematical divisions of the area or the representation of the area, typically in a regular linear rectangular fashion, into cells, although other manners of division are possible such as concentric circles and radii extending from a center point of the area, or the like. However, for simplicity, as referred to herein, the grid is a series of regularly spaced interconnecting lines that form square or rectangular cells covering the geographical area. Once divided, the cells can be associated with rules including DST participation and other information for the corresponding geopolitical portions at 603. The associations can then be stored at 604, for example in a table, such as in the manner described above in connection with Table 1 and updated when changes occur. Changes can include changes to the time zone application rules, the DST participation, information such as the start and end times for DST participation, the boundaries of the geopolitical areas, involving the addition of new geopolitical portions to the geographical area, and so on. For simplicity, the cell can be associated with a geopolitical region or "color" as noted in Table 1.

A present location can be mapped to one of the cells in the grid based on, for example, SPS-based coordinates at 605. It can then be determined whether more than one color is associated with the cell. If more than one color is associated, corresponding to YES at 606, the process proceeds to 607 where the resolution can be increased until the present cell is located as near as possibly to fully within a portion having a single color. When the resolution is increased, it will be appreciated that a new grid can be established at 602 at the new resolution. Additional steps such as those associated with 603-607 can be repeated. If there is not more than one color or geopolitical portion in the cell, corresponding to NO at 606, a local time zone setting can be automatically provided at 608 based on the rules for the cell and the underlying color and, for example, the date/time obtained with the SPS coordinates or with non-SPS based location information. When the color for the cell is determined, the association between the color and the rules and other information for the color can be referenced. Accordingly, a mobile unit, for example, can determine the cell within which it is located, can determine the "color" or geopolitical assignment for the cell, and, with the date/time, thereby reference the time zone information for the cell. It should be noted that by automatically providing the correct setting as discussed in connection with 608, the local time zone setting can be provided as a suggestion or recommended setting for the correct time zone and DST participation at 609 including displaying the suggested time zone, actually asserting the local time zone setting based on the rules for the geopolitical portion, or some combination. When the local time zone has been automatically provided, the process can terminate at 610; however it will be appreciated that the system can easily be configured to operate continuously when the mobile unit is in operation so as to acquire new color assignment for new locations when the mobile unit travels to new geopolitical portions or if a device is shipped to a new location after manufacture or the like.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate the interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment or embodiments can include an article of manufacture such as a computer readable media with instructions which, when executed by a computer, a processor, or the like, embody a method for setting a time zone and a DST in a device including or having access to an SPS receiver or other receiver capable of obtaining location and date/time information. Accordingly, the invention is not limited to illustrated examples and any means for performing the functionality described herein are intended to be included in embodiments.

While the foregoing disclosure shows illustrative embodiments, it should be noted that various changes and modifications could be made herein without departing from the scope of the invention as defined by the appended claims. The functions, steps and/or actions of the method claims in accordance with the embodiments described herein need not be performed in any particular order. Furthermore, although elements may be described or claimed in the singular, the plural is contemplated unless limitation to the singular is explicitly stated.

What is claimed is:

1. A method for automatically providing a local time zone setting for a device comprising:
    obtaining a location estimate of a present location of the device within a geographical area and a present date and time;
    identifying a cell of a grid depicting a graphical area comprising the location estimate, wherein the cell is subject to first time zone application rules, wherein in response to determining that the cell is subject to two or more time zones, identifying a first sub-cell, within the cell, comprising the location estimate, the first sub-cell being subject to second time zone application rules; and
    automatically providing the local time zone setting and the present date and time at least partially based on:
        the first time zone application rules at least partially in response to the determining that the cell is subject to a single time zone, or
        the second time zone application rules at least partially in response to the determining that the cell is subject to the two or more time zones.

2. The method according to claim 1, wherein the location estimate is determined from satellite positioning system (SPS) signals, and wherein the date and time include a universal date and time.

3. The method according to claim 1, wherein the time zone application rules include a daylight savings time (DST) participation in a geopolitical portion.

4. The method according to claim 1, further comprising updating the time zone application rules at least partially in response to changes to a predetermined geopolitical portion.

5. The method according to claim 1, further comprising displaying the geographical area and the time zone application rules on a color map.

6. The method according to claim 1, wherein the automatically providing the local time zone setting includes directly setting a present time zone in the device.

7. The method according to claim 1, wherein the automatically providing the local time zone setting includes providing a recommended local time zone setting.

8. A method for automatically providing a local time zone setting for a device comprising:
    obtaining location information for a present location of the device within a geographical area and a present date and time;
    establishing an association between the present location and a geopolitical portion of the geographical area, the geopolitical portion including time zone application rules, wherein the establishing the association further includes establishing cells associated with the geographical area at a first resolution such that one of the cells is associated with at least part of the geopolitical portion of the geographical area; and
    automatically providing the local time zone setting based on the time zone application rules and the present date and time.

9. The method according to claim 8, further comprising associating at least some of the cells with the time zone application rules for the geopolitical portion; mapping the present location of the device to one of the cells based on the location information for the present location; and automatically providing the local time zone setting based on the time zone application rules and the date and time.

10. The method according to claim 8, further comprising maintaining a table of the associations between the cells and the time zone application rules and updating the table of the associations when changes occur in the time zone application rules.

11. The method according to claim 8, wherein the establishing the cells further include further establishing the cells at a second resolution if the one of the cells includes more than one of the geopolitical portion, the cells established at the second resolution such that the present location can be associated with only one of the more than one of the geopolitical portion.

12. An apparatus for automatically providing a local time zone setting for a device, the apparatus comprising:
  a receiver in the device, the receiver obtaining a location estimate of a present location of the device within a geographical area and a present date and time;
  a processor coupled to the receiver, the processor to:
    identify a cell of a grid depicting a graphical area comprising the location estimate, wherein the cell is subject to first time zone application rules, wherein in response to determining that the cell is subject to two or more time zones, identifying a first sub-cell, within the cell, comprising the location estimate, the first sub-cell being subject to second time zone application rules; and
    automatically provide the local time zone setting and the present date and time at least partially based on:
      the first time zone application rules at least partially in response to the determining that the cell is subject to a single time zone, or
      the second time zone application rules at least partially in response to the determining that the cell is subject to the two or more time zones.

13. An apparatus according to claim 12, further comprising:
  a memory coupled to the receiver and the processor, the memory to store a mapping of the time zone application rules for a corresponding plurality of geopolitical portions of the geographical area,
  wherein the processor is further configured to update the mapping when changes occur in the time zone application rules.

14. An apparatus according to claim 12, further comprising:
  a display unit coupled to the receiver and the processor, the display unit configured to display a mapping of the plurality of cells, and to display the automatically provided local time zone setting as a proposed time zone setting; and
  an input device coupled to the receiver and the processor, the input device accepting an input to confirm the local time zone setting is accepted.

15. An apparatus according to claim 12, further comprising:
  a display unit coupled to the receiver and the processor, the display unit configured to:
    display a mapping of the plurality of cells as a color map; and
    display the local time zone setting as a proposed time zone setting; and
  an input device coupled to the receiver and the processor, the input device accepting an input to confirm whether the local time zone setting is accepted.

16. An apparatus for automatically providing a local time zone setting for a device, the apparatus comprising:
  a receiver in the device, the receiver obtaining location information for a present location of the device within a geographical area and a present date and time;
  a processor coupled to the receiver, the processor configured to:
    establish an association between the present location and a geopolitical portion of the geographical area, the geopolitical portion including time zone application rules;
    map the present location of the device to one of a plurality of cells associated with the geographical area, the one of the plurality of cells associated with the geopolitical portion; and
    automatically provide the local time zone setting for the present time zone based on the time zone application rules and the present date and time for the geopolitical portion associated with the one of the plurality of cells and the date and time.

17. An apparatus for automatically providing a local time zone setting for a device, the apparatus comprising:
  a receiver in the device, the receiver obtaining location information for a present location of the device within a geographical area and a present date and time;
  a processor coupled to the receiver, the processor configured to:
    establish an association between the present location and a geopolitical portion of the geographical area, the geopolitical portion including time zone application rules; and
    automatically provide the local time zone setting based on the time zone application rules and the present date and time; and
  a memory coupled to the receiver and the processor, the memory configured to store a mapping of the plurality of cells and corresponding ones of the time zone application rules for a corresponding plurality of geopolitical portions of the geographical area,
  wherein the processor is further configured to update the mapping when new geopolitical portions are added to the geographical area.

18. An apparatus for automatically providing a local time zone setting for a device, the apparatus comprising:
  a receiver in the device, the receiver obtaining location information for a present location of the device within a geographical area and a present date and time;
  a processor coupled to the receiver, the processor configured to:
    establish an association between the present location and a geopolitical portion of the geographical area, the geopolitical portion including time zone application rules; and
    automatically provide the local time zone setting based on the time zone application rules and the present date and time;
  a display unit coupled to the receiver and the processor, the display unit configured to:
    display the mapping of the plurality of cells as a color map; and
    display the local time zone setting as a proposed time zone setting; and
  an input device coupled to the receiver and the processor, the input device accepting an input to confirm whether the local time zone setting is accepted, wherein, if the local time zone setting is confirmed as accepted, the processor is further configured to automatically provide the local time zone setting for the present time zone by updating the present time zone setting with the local time zone setting.

19. An apparatus for automatically providing a local time zone setting for a device comprising:
   means for obtaining a location estimate of a present location of the device within a geographical area and a present date and time;
   means for identifying a cell of a grid depicting a graphical area comprising the location estimate, wherein the cell is subject to first time zone application rules, wherein in response to determining that the cell is subject to two or more time zones, identifying a first sub-cell, within the cell, comprising the location estimate, the first sub-cell being subject to second time zone application rules; and
   means for automatically providing the local time zone setting and the present date and time at least partially based on:
      the first time zone application rules at least partially in response to the determining that the cell is subject to a single time zone, or
      the second time zone application rules at least partially in response to the determining that the cell is subject to the two or more time zones.

20. An apparatus for automatically providing a local time zone setting for a device comprising:
   means for obtaining location information for a present location of the device within a geographical area and a present date and time;
   means for establishing an association between the present location and a geopolitical portion of the geographical area, the geopolitical portion including time zone application rules;
   means for automatically providing the local time zone setting based on the time zone application rules and the present date and time;
   means for mapping the present location of the device to one of a plurality of cells, the one of the plurality of cells associated with the geographical portion; and
   memory means for storing a mapping of the plurality of cells and corresponding ones of the time zone application rules for a corresponding plurality of geopolitical portions of the geographical area.

21. An apparatus according to claim 20, wherein the memory means is further for updating the stored mapping when changes occur in the time zone application rules.

22. An apparatus according to claim 20, wherein the memory means is further for updating the stored mapping when new geopolitical portions are added to the geographical area.

23. An apparatus according to claim 20, further comprising means for displaying the mapping of the plurality of cells and automatically providing the local time zone setting as a proposed time zone setting.

24. An apparatus according to claim 20, further comprising means for displaying the mapping of the plurality of cells as a color map and automatically providing the local time zone setting.

25. An apparatus according to claim 23, further comprising input means for accepting an input to confirm whether the local time zone setting is accepted.

26. An apparatus according to claim 25, further comprising means for updating the present time zone setting with the local time zone setting if the local time zone setting is confirmed as accepted.

27. An apparatus according to claim 20, further comprising means for displaying the mapping of the plurality of cells as a color map and automatically providing the local time zone setting.

28. A computer-readable medium comprising instructions to automatically provide a local time zone setting for a device, the instructions being executable by a computer to:
   obtain a location estimate of a present location of the device within a geographical area and a present date and time;
   identify a cell of a grid depicting a graphical area comprising the location estimate, wherein the cell is subject to first time zone application rules, wherein in response to determining that the cell is subject to two or more time zones, identifying a first sub-cell, within the cell, comprising the location estimate, the first sub-cell being subject to second time zone application rules; and
   automatically the local time zone setting and the present date and time at least partially based on:
      the first time zone application rules at least partially in response to the determining that the cell is subject to a single time zone, or
      the second time zone application rules at least partially in response to the determining that the cell is subject to the two or more time zones.

29. A computer-readable medium comprising instructions to automatically provide a local time zone setting for a device, the instructions being executable by a computer to:
   obtain location information for a present location of the device within a geographical area and a present date and time;
   establish an association between the present location and a geopolitical portion of the geographical area, the geopolitical portion including time zone application rules;
   automatically provide the local time zone setting based on the time zone application rules and the present date and time; and
   map the present location of the device to one of a plurality of cells, the one of the plurality of cells associated with the geographical portion; and
   store a mapping of the plurality of cells and corresponding ones of the time zone application rules for a corresponding plurality of geopolitical portions of the geographical area.

* * * * *